(12) United States Patent
Doerr

(10) Patent No.: US 7,706,648 B2
(45) Date of Patent: Apr. 27, 2010

(54) TUNABLE OPTICAL DISPERSION COMPENSATING APPARATUS

(75) Inventor: Christopher Doerr, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 607 days.

(21) Appl. No.: 11/690,822

(22) Filed: Mar. 24, 2007

(65) Prior Publication Data
US 2009/0116789 A1    May 7, 2009

(51) Int. Cl.
*G02B 6/34* (2006.01)
*G02B 6/12* (2006.01)
*G02B 6/293* (2006.01)

(52) U.S. Cl. ................ 385/37; 385/14; 385/24
(58) Field of Classification Search ........................ None
See application file for complete search history.

(56) References Cited

U.S. PATENT DOCUMENTS

| | | | | |
|---|---|---|---|---|
| 6,289,147 | B1 * | 9/2001 | Bulthuis et al. | 385/24 |
| 6,606,433 | B2 * | 8/2003 | Oguma et al. | 385/37 |
| 6,728,446 | B2 * | 4/2004 | Doerr | 385/37 |
| 7,305,162 | B2 * | 12/2007 | Nikonov et al. | 385/39 |
| 7,555,175 | B2 * | 6/2009 | Nara | 385/14 |
| 2003/0128926 | A1 * | 7/2003 | Doerr | 385/37 |
| 2003/0133655 | A1 * | 7/2003 | Dingel | 385/37 |
| 2003/0223694 | A1 * | 12/2003 | Nikonov et al. | 385/39 |
| 2008/0044122 | A1 * | 2/2008 | Fondeur et al. | 385/1 |

* cited by examiner

*Primary Examiner*—Michelle R Connelly Cushwa
(74) *Attorney, Agent, or Firm*—Brosemer, Kolefas & Associates

(57) ABSTRACT

A tunable optical dispersion compensator (TODC) having a silica arrayed-waveguide grating (AWG) directly coupled at its input to a Mach-Zehnder interferometer device and at its output to a polymer thermo-optic lens.

9 Claims, 4 Drawing Sheets

TUNABLE OPTICAL DISPERSION COMPENSATING APPARATUS

CROSS-REFERENCE TO RELATED APPLICATIONS

This application is related to U.S. patent application Ser. No. 11/308,045 filed on Mar. 3, 2006 and U.S. patent application Ser. No. 11/164,644 filed Nov. 30, 2005.

FIELD OF THE INVENTION

This invention relates generally to the field optical communications and in particular to a tunable optical dispersion compensator.

BACKGROUND OF THE INVENTION

In long-distance transmission of optical signals, the accumulation of chromatic dispersion in optical fibers presents serious problems. These problems intensify with an increase in bit rate and the distance traveled by the optical signals. Efforts to date that compensate for dispersion have primarily involved the use of dispersion compensating optical fibers (DCF).

Dispersion compensating efforts that employ DCF—while well-proven—are not particularly amenable to integration in existing network elements. This is due—in part—because DCF is employed as a large spool of fiber which occupies significant space in a network office and is not adjustable. In addition, service providers that utilize DCF in their networks must accurately characterize their fiber, deploy more expensive optical amplifiers and accept additional latency added to links employing the DCF [~20% additional latency for a fully compensated standard-single-mode fiber (SSMF) link]. Finally, DCF cannot satisfy all of the dispersion compensation requirements of many 40-Gb/s links, consequently a tunable optical dispersion compensator (TODC) having a small tuning range is often required in addition to the DCF.

A TODC employing an arrayed waveguide grating (AWG) and thermo-optic lens was described in U.S. Pat. No. 7,006,730 directed to a "Multichannel Integrated Tunable Thermo-Optic Lens and Dispersion Compensator the entire contents of which are hereby incorporated by reference. The TODC described therein appeared to be an attractive alternative/supplement to DCF.

SUMMARY OF THE INVENTION

I have developed according to the present invention a tunable optical dispersion compensator (TODC) including a Mach-Zehnder interferometer structure coupled to selected inputs of a silica arrayed-waveguide grating (AWG) apparatus, the output of which is coupled to an adjustable lens. Advantageously, the Mach-Zehnder interferometer structure broadens the transmissivity passband of the TODC at high dispersion settings in a low-loss manner.

According to an aspect of the invention, the Mach-Zehnder interferometer structure has two optical paths of different length namely $L_1$ and $L_1+\Delta L_1$ which is coupled to central input waveguides of an AWG apparatus having a number of unequal length waveguides that differ in length by an integer multiple of $\Delta L_1$.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
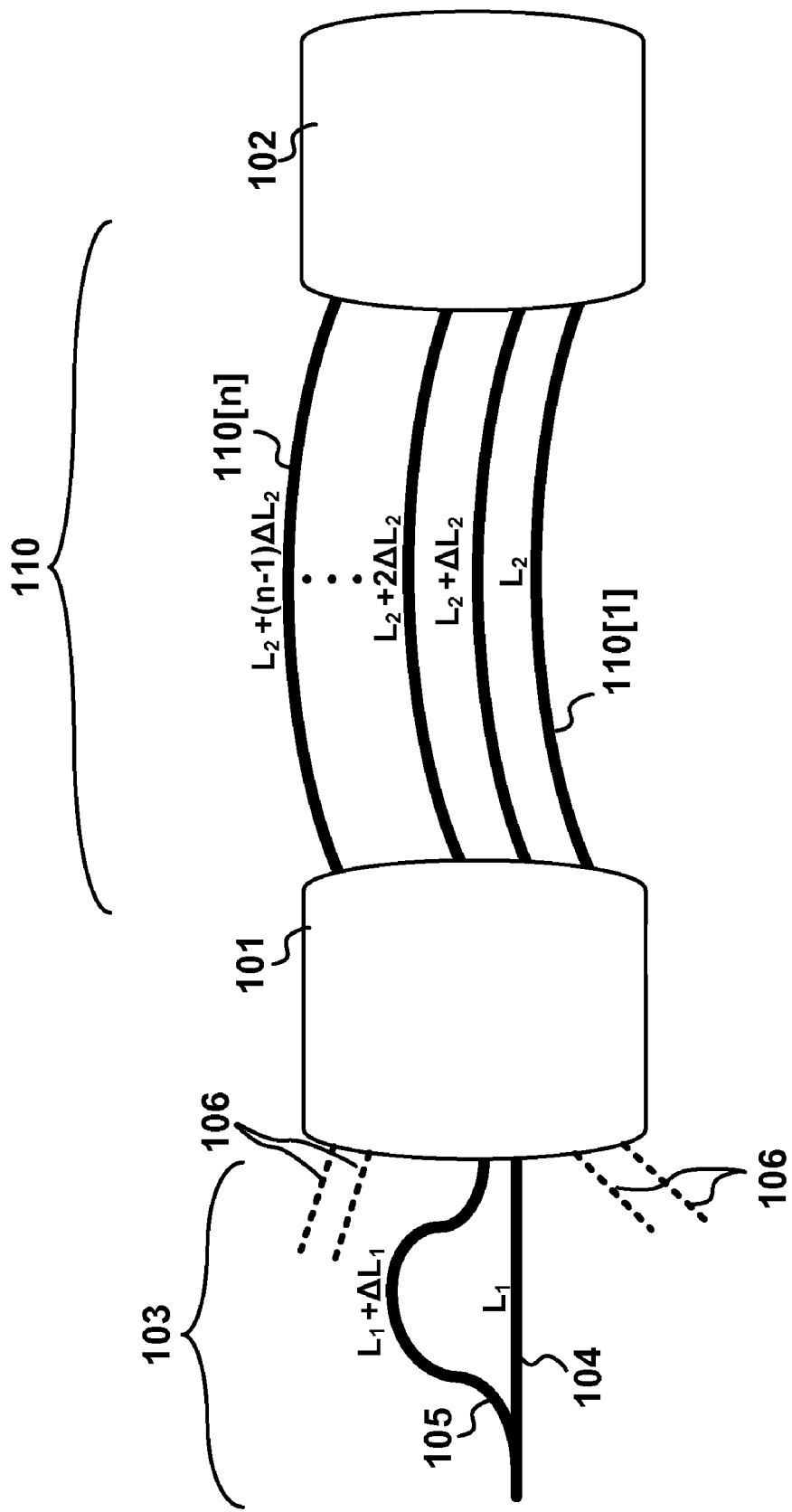
FIG. 1 is a schematic of an arrayed waveguide grating coupled to a Mach-Zehnder interferometer structure according to the present invention.

With initial reference to FIG. 1, those skilled in the art will quickly recognize the well-known frequency routing device 110 which may operate as a multiplexer and demultiplexer of optical frequencies. Such frequency routing devices, are well known in the art and are described in more detail in U.S. Pat. No. 5,002,350 which issued to Dragone on Jan. 30, 1996, the entire contents of which are hereby incorporated by reference. As further known by those skilled in the art, such devices are often referred to as arrayed waveguide gratings (AWGs).

Star coupler(s) 101, 102 each include a plurality of input ports connected to a plurality of output ports via a free space region. The plurality (N) of output ports (for coupler 101) are connected to N waveguides 110[1] ... 110[n], which provide a pre-determined amount of path length difference to a corresponding plurality (N) of input ports of star coupler 102. Preferably, these devices are formed from waveguides and integrated onto an optical "chip" (not specifically shown) and each of the couplers may include one or more input and/or output waveguides e.g., 106.

With these preliminary structures described, we may now describe more particularly an apparatus according to the present invention. With continued reference to FIG. 1, there is shown a Mach-Zehnder interferometer device 103 having two arms 104, 105 which are optically communicating with and providing input to the first star coupler 101 at a location of the star coupler normally associated with the central two input ports (not specifically shown). Accordingly, an input optical signal entering the Mach-Zehnder interferometer device 103 is split such that portions of the split signal traverse the two arms 104, 105 and are subsequently introduced into the first star coupler 101. As shown in this FIG. 1, one of the arms 104 of the Mach-Zehnder interferometer device 103 exhibits a path length $L_1$ while the other (longer) arm 105 exhibits a path length of $L_1+\Delta L_1$ Note that 103 is a special Mach-Zehnder interferometer in that the right-hand side coupler is the star coupler 101 itself. There is no 2×1 or 2×2 50/50 coupler in 103 in this design.

The first star coupler 101 is optically connected to the second star coupler 102 via an array of waveguides 110[1] ... 110[n] having a predetermined length. According to an aspect of the present invention, the lengths of the waveguides in the array increase by an amount substantially equal to $\Delta L_2$, where $\Delta L_2$ is the length difference between the two paths (104, 105) of the Mach-Zehnder interferometer structure 103. More particularly, the first waveguide 110[1] exhibits a path length of $L_2$ and each successive waveguide in the array is increased in length by an amount substantially equal to $\Delta L_2$. There may be a small deviation in $\Delta L_2$, i.e., a chirp, without departing from the spirit of the invention. Accordingly, the second waveguide in the array 110[2] will exhibit a length of $L_2+\Delta L_2$; the third waveguide 110[3] will exhibit a length of $L_2+2\Delta L_2$. Accordingly, the last waveguide 110[n] will exhibit a length of $L_2+(n-1)\Delta L_2$ where n is the number of the waveguide in the array. The combined structure 101, 110, and 102 is known as an AWG.

Figure 2:
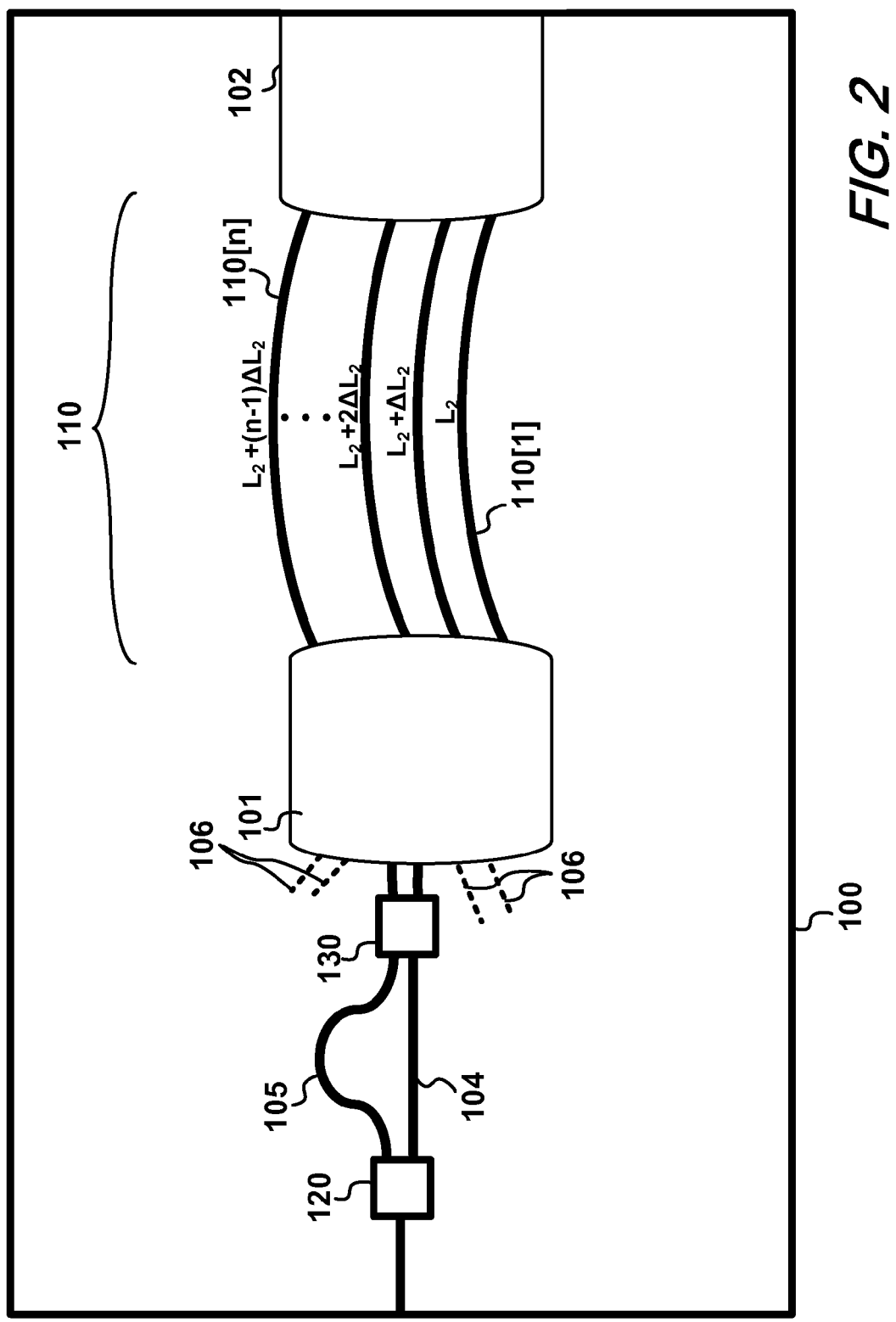
FIG. 2 is a schematic of an arrayed waveguide grating coupled to a Mach-Zehnder interferometer integrated on a single optical chip according to the present invention.

Turning now to FIG. 2, there is shown an integrated device constructed according to the teachings of the present invention which may advantageously serve as a foundation for a TODC. With particular reference to FIG. 2, there is shown an integrated optical chip 100 including an AWG having a pair of star couplers 101, 102 optically interconnected by a plurality of waveguides 110 comprising a number of unequal length individual waveguides 110[1], 110[2] ... 110[n]. Coupled to a central pair of input waveguides of the first star coupler 101 is a Mach-Zehnder interferometer device comprising a pair of optical waveguides 104, 105 which are optically coupled by optical couplers 120 and 130. Optical chip 100 is preferably a planar lightwave circuit (PLC).

As shown in FIG. 2 and discussed with respect to FIG. 1, one of the two waveguides comprising the Mach-Zehnder interferometer device exhibits a length of $L_1$, while the other waveguide 105 exhibits a length that is substantially L+$\Delta$L in length. As shown further in FIG. 2, the lengths of the waveguides comprising the AWG are related to $\Delta L_2$, wherein each of the individual waveguides 110[1], 110[2] ... 110[n] comprising the AWG 110 exhibit a path length of substantially $L_2$, $L_2+\Delta L_2$, ... $L_2+(n-1)\Delta L_2$, respectively.

Those skilled in the art will now observe that the second star coupler 102 is positioned at the edge of optical chip 100. More particularly, it is positioned such that an edge of the chip is located where output waveguides (not specifically shown) would normally be found in a pure frequency routing device. As will be shown, this structure permits the advantageous construction of a TODC.

Figure 3:
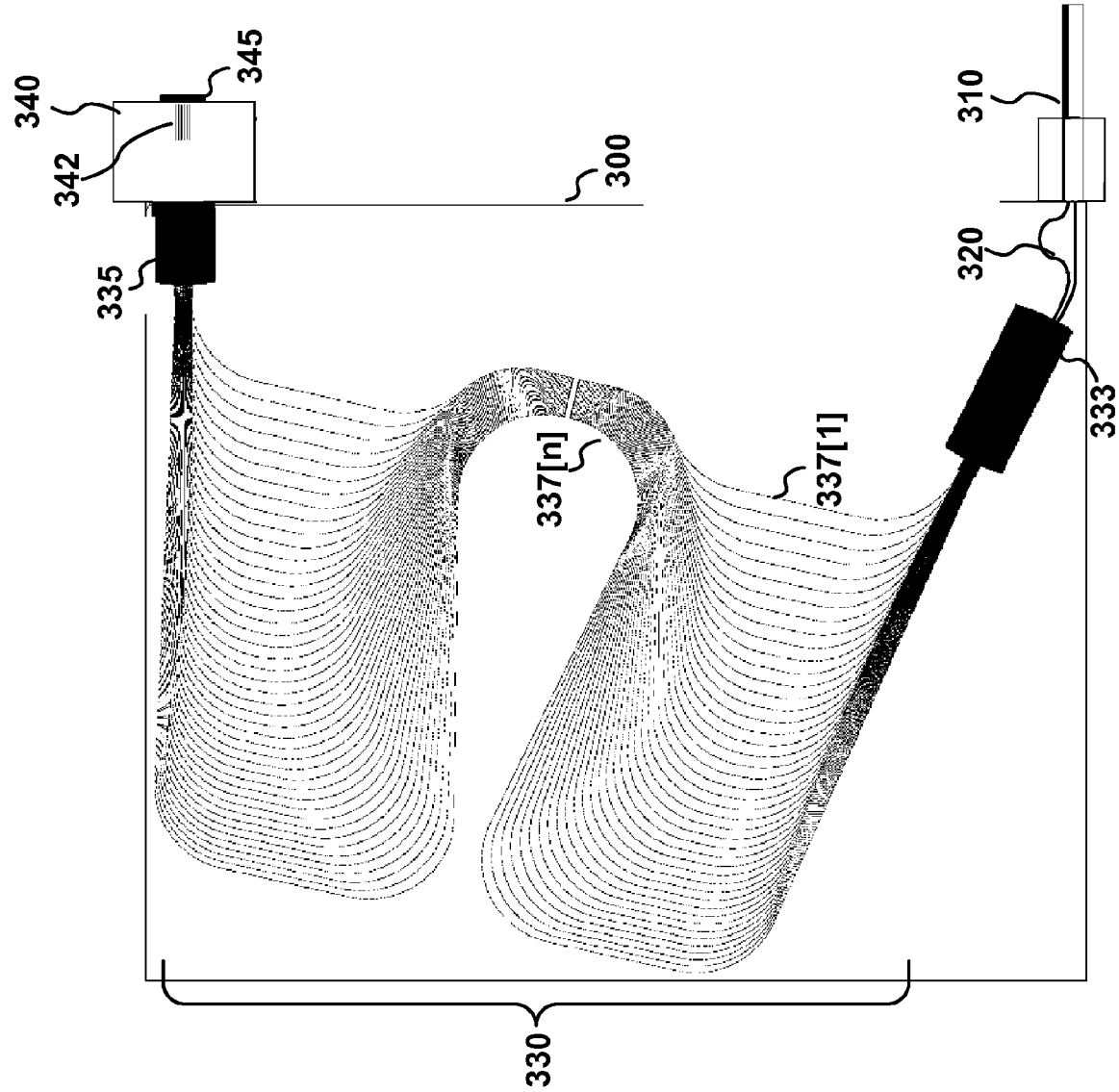
FIG. 3 is a schematic of an integrated TODC according to the present invention.

Turning now to FIG. 3, a representative layout of an integrated TODC is shown. More particularly, optical signals are input to the optical chip 300 through input optical waveguide 310 which is coupled to Mach-Zehnder interferometer structure 320. The Mach-Zehnder interferometer structure is coupled to inputs of a first star coupler 333 of a frequency routing device comprising the first star coupler 333, and a second star coupler 335, which are optically interconnected by a number of unequal length waveguides 337[1] ... 337[n] which comprise an AWG 330.

Shown in FIG. 3, the second star coupler 335 is positioned at an edge of the optical chip 300 at a point where output waveguides would normally be positioned. Affixed to that edge of the optical chip, is preferably is a small planar lightwave circuit PLC 340 which includes a lens element 342 and a mirror 345. The lens element 342 is an element that provides a parabolic refractive index profile for adjusting the amount of dispersion provided by the TODC. As may be appreciated, PLC 340 may be either monolithically integrated with the main PLC 100 or may be a separate chip. Possible implementations of the lens element 342 include a thermooptic lens or electrooptic lens. In the case where it is a thermooptic lens, the lens element 342 is preferably constructed from a material that exhibits a suitable refractive index change upon heating while sufficiently dissipating the heat.

When configured in this manner, portions of light input to input/output waveguide 310 traverses the first slab waveguide star coupler 333, the grating 330, the second slab waveguide star coupler 335, traverses the lens PLC 340, is reflected by the mirror 345, and subsequently output via input/output waveguide 310 having an amount of its accumulated dispersion compensated. In a preferred embodiment, the mirror 345 length along slab 335 will only be equal to or less than the width of the Brillouin zone of grating 330. This ensures that high diffraction orders from the grating are not reflected back into the grating. In addition, the mirror 345 is preferably flat, as it is easiest to cut and/or polish a flat surface, both for the PLC 340 and for the mirror 345. As can be appreciated, when the mirror 345 is flat, the device provides negative dispersion when no lens element 342 is not activated which compensates the dispersion of most single-mode optical fibers. The mirror 345 may also be curved, which will adjust the non-activated-lens dispersion setting.

It is explained in U.S. Pat. No. 7,006,730 (which is hereby incorporated by reference) how the TODC operates when structure 320 is replaced by a single waveguide. A fundamental issue with that TODC design is that the transmissivity passband narrows as the dispersion magnitude is increased. This narrowing is due to the fact that at the wavelengths at the edges of the passband, the lens element 342 causes the light distribution to be off-center in the waveguide array 330. This in turn causes the light to be focused at a tilted angle into the output waveguide 310 when 320 is not present, causing high loss at the passband edges, and thus narrowing the passband. The present invention is the addition of element 320. Element 320 accepts this tilted beam with significantly higher efficiency than a single waveguide, thus improving the loss at the passband edges. The net result of adding element 320 is a significantly wider transmissivity passband at high dispersion settings. We must change the effective orientation of element 320 when the sign of dispersion changes (i.e., the longer arm must trade places with the shorter arm), and at zero dispersion we do not want 320 at all. These adjustments are addressed by FIG. 4.

Figure 4:
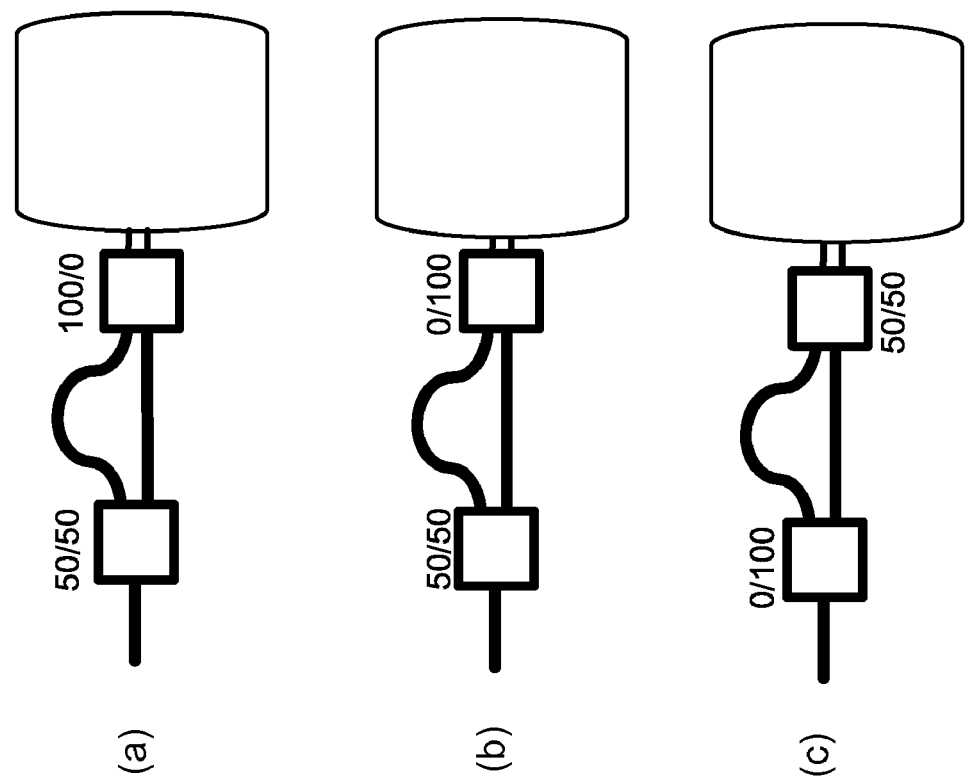
FIG. 4 is a series of schematics showing various coupling configurations of the Mach-Zehnder interferometer structure according to the present invention.
Figure 4:
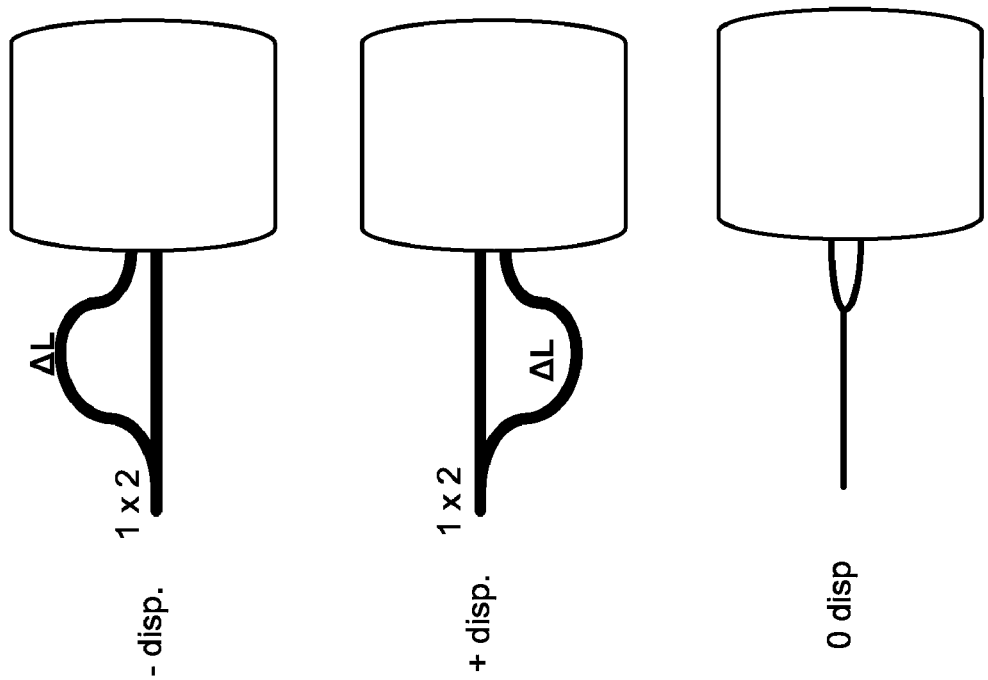

Turning now to that FIG. 4, there is shown a series of schematic diagrams (a), (b) and (c) showing representative input configurations according to the present invention for – dispersion, + dispersion and 0 dispersion respectively. Note that in these diagrams, only the Mach-Zehnder interferometer structure(s) and first star coupler are shown from the configuration of FIG. 2. Also, it is assumed that the Mach-Zehnder interferometer structure is coupled to the two center input waveguides of that first star coupler and the optional dummy waveguides are not shown for clarity.

More particularly, FIG. 4(a) shows a – dispersion configuration wherein a first coupler of the Mach-Zehnder interferometer structure includes a 1×2 (50/50) coupler and a second coupler of that Mach-Zehnder interferometer structure is a 100/0 coupler. FIG. 4(b) is a + dispersion configuration and the first coupler of the Mach-Zehnder interferometer structure includes a 1×2 coupler (50/50) while the second coupler is a 0/100 coupler. Finally, FIG. 4(c) shows a 0 dispersion configuration where the first coupler is a 0/100 configuration while the second is a 50/50.

Although FIG. 3 shows a reflective structure for the TODC, one could create a transmissive structure by duplicating the structure and making it symmetric about the mirror 345 and removing mirror 345.

Although the previous discussion has focused on a tunable optical dispersion compensator, one may also use this invention to construct a fixed optical dispersion compensator. In such a case, lens element 342 is either non-adjustable or non-existent.

At this point, while we have discussed and described our invention using some specific examples, those skilled in the art will recognize that our teachings are not so limited. Accordingly, our invention should be only limited by the scope of the claims attached hereto.

The invention claimed is:

1. An optical apparatus comprising:
   a frequency routing device including an arrayed waveguide grating; and
   a Mach-Zehnder interferometer device optically coupled to inputs of said frequency routing device;
   CHARACTERIZED IN THAT
   the Mach-Zehnder interferometer device includes a pair of arms having lengths of $L_1$ and $L_1+\Delta L_1$ respectively; and
   the arrayed waveguide grating includes n interconnecting waveguides having lengths of substantially $L_2$, $L_2+\Delta L_2$, ..., $L_2+(n-1)\Delta L_2$;
   wherein $0.6\Delta L_1 < \Delta L_2 < 1.4\Delta L_1$.

2. The optical apparatus of claim 1 wherein said frequency routing device comprises a first slab waveguide and a second slab waveguide and the arrayed waveguides optically interconnecting the first slab waveguide to the second slab waveguide.

3. The optical apparatus of claim 2 wherein said second slab waveguide includes a mirror, positioned at a focal point on a side of the waveguide opposite the grating.

4. The optical apparatus of claim 2 wherein said second slab waveguide includes a lens element, interposed between the mirror and the grating.

5. The optical apparatus of claim 1 wherein said Mach-Zehnder interferometer device includes at least one optical coupler in optical communication with the two arms, said one optical coupler being substantially a 50/50 coupler.

6. The optical apparatus of claim 1 wherein said Mach-Zehnder interferometer device includes at least one optical coupler in optical communication with the two arms, said one optical coupler being substantially a 100/0 coupler.

7. The optical apparatus of claim 1 wherein said Mach-Zehnder interferometer device includes at least one optical coupler in optical communication with the two arms, said one optical coupler being substantially a 0/100 coupler.

8. The optical apparatus of claim 5 wherein said Mach-Zehnder interferometer device includes a second optical coupler in optical communication with the two arms, said second optical coupler being substantially a 100/0 coupler.

9. The optical apparatus of claim 5 wherein said Mach-Zehnder interferometer device includes a second optical coupler in optical communication with the two arms, said second optical coupler being substantially a 0/100 coupler.

* * * * *